(12) United States Patent  (10) Patent No.: US 9,171,150 B2
Gluck et al.  (45) Date of Patent: *Oct. 27, 2015

(54) SYSTEM AND METHOD FOR DYNAMIC ANALYSIS TRACKING OBJECTS FOR APPLICATION DATAFLOW

(71) Applicant: salesforce.com, inc., San Francisco, CA (US)

(72) Inventors: Yoel Gluck, San Francisco, CA (US); Xiaoran Wang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,131

(22) Filed: Oct. 30, 2013

(65) Prior Publication Data

US 2014/0173741 A1  Jun. 19, 2014

Related U.S. Application Data

(60) Provisional application No. 61/737,243, filed on Dec. 14, 2012.

(51) Int. Cl.
*G06F 11/00* (2006.01)
*G06F 21/54* (2013.01)
*H04L 29/06* (2006.01)

(52) U.S. Cl.
CPC ............ *G06F 21/54* (2013.01); *H04L 63/1433* (2013.01); *G06F 2221/2101* (2013.01)

(58) Field of Classification Search
CPC ............ G06F 21/54; G06F 2221/2101; G06F 21/577; G06F 17/30; G06F 8/34; G06F 21/57; H04L 63/1433; G06Q 10/08
USPC ................ 726/22–25; 717/130; 707/736, 800
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |

(Continued)

OTHER PUBLICATIONS

U.S. Appl. No. 13/998,890, filed Dec. 18, 2013.

(Continued)

*Primary Examiner* — Thanhnga B Truong
(74) *Attorney, Agent, or Firm* — Dergosits & Noah LLP; Todd A. Noah

(57) ABSTRACT

Systems and methods are provided for dynamic analysis tracking objects for application dataflow. A system receives a data object from a data source, creates a source tracking object for the data object, and records information associated with the data source into the source tracking object. The system creates a copy of the data object for a tracking event in the application program, creates a flow tracking object for the tracking event, and records information associated with the tracking event into the flow tracking object as the tracking event processes the copy of the data object. The system outputs the copy of the data object to a data sink, creates a sink tracking object for the data sink, and records information associated with the data sink into the sink tracking object. The system outputs the source tracking object, the flow tracking object, and the sink tracking object as dynamic analysis of dataflow in the application program.

20 Claims, 4 Drawing Sheets

(56) References Cited

U.S. PATENT DOCUMENTS

| | | |
|---|---|---|
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,809,761 B2 * | 10/2010 | Ferguson .................. 707/800 |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0112037 A1 | 5/2006 | Chagoly et al. |
| 2007/0016949 A1 | 1/2007 | Dunagan et al. |
| 2009/0063415 A1 | 3/2009 | Chatfield et al. |
| 2009/0064114 A1 | 3/2009 | Bottomley et al. |
| 2009/0100342 A1 | 4/2009 | Jakobson |
| 2009/0177744 A1 | 7/2009 | Marlow et al. |
| 2011/0321016 A1 | 12/2011 | Haviv et al. |
| 2012/0102029 A1 * | 4/2012 | Larson et al. .................. 707/736 |
| 2012/0233137 A1 | 9/2012 | Jakobson et al. |
| 2013/0086424 A1 | 4/2013 | Smiljanic et al. |
| 2013/0160131 A1 | 6/2013 | Madou et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0137084 A1 | 5/2014 | Tripp |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |

OTHER PUBLICATIONS

U.S. Appl. No. 13/986,251, filed Apr. 16, 2013.

* cited by examiner

SYSTEM AND METHOD FOR DYNAMIC ANALYSIS TRACKING OBJECTS FOR APPLICATION DATAFLOW

CLAIM OF PRIORITY

This application claims the benefit of U.S. Provisional Patent Application 61/737,243 entitled DATAFLOW TRACKING WITH NODE OBJECTS IN RUNTIME ANALYSIS, by Gluck, et al., filed Dec. 14, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DYNAMIC ANALYSIS TRACKING OBJECTS FOR APPLICATION DATAFLOW

One or more implementations relate generally to dynamic analysis tracking objects for application dataflow.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Vulnerabilities in an application program may be introduced by untrusted data flowing through the application program from an input to an output without the application program performing sufficient actions to prevent potential cyber-security attacks from occurring. For example, an application program may use a uniform resource locator (URL) to receive data that the application program subsequently outputs as data accessed by a web browser, but a web browser displaying a web page based on untrusted data may enable an attacker to gain elevated access-privileges to sensitive web page content. An input for untrusted data is referred to as a taint source, and the output for untrusted data is referred to as a taint sink. Static analysis that tests the security of an application program for vulnerabilities may produce a high rate of false positive results. Dynamic analysis has gained popularity due to the production of fewer false positive results. Therefore, if dynamic analysis identifies a vulnerability in an application program, the vulnerability is more likely to be an actual vulnerability, thereby justifying the expense of sufficient resources in an attempt to analyze the application program's associated dataflow to correct the vulnerability. Dynamic analysis typically identifies application program vulnerabilities such as cross site scripting (XSS) and SQL injection (SQLi).

While dynamic analysis is able to identify application program vulnerabilities by their data sources and data sinks, dynamic analysis does not keep track of the complete flow of tainted data because of problems with recording any information in between the data source and the data sink. Without the information of how data flows in an application program, correcting vulnerabilities is difficult because identifying only a data source and a data sink does not provide any clear indication of the nature of any vulnerabilities between the data source and the data sink. Such difficulties become greater for large application programs, where manually searching source code to review the detailed data flow of possible vulnerabilities is extremely time consuming, and manually identifying the detailed data flow of actual vulnerabilities in the source code is nearly impossible.

Additionally, an application program may have multiple possible paths from the same data source to the same data sink. Since dynamic analysis can identify the same vulnerability many times, dynamic analysis typically executes a de-duplication process based on the information describing the vulnerability. Since only the data sources and data sinks are identified, the de-duplication process can mistakenly identify multiple different vulnerabilities that share the same data source and the same data sink as only a single vulnerability. Therefore, identifying all of the actual vulnerabilities becomes more difficult without identifying the specific dataflow between a data source and a data sink. Accordingly, it is desirable to provide techniques that enable a system to improve the performance, efficiency, and the ease of use of dynamic analysis of dataflow in application programs.

BRIEF SUMMARY

In accordance with embodiments, there are provided systems and methods for dynamic analysis tracking objects for application dataflow. A system receives a data object from a data source, creates a source tracking object for the data object, and records information associated with the data source into the source tracking object. For example, a system gets a parameter from an untrusted data source, stores the parameter as a tainted data object, creates a source tracking object, embeds the source tracking object in the tainted data object, and records information about the tainted data source, and the location in an application program where the tainted data was collected, into the embedded source tracking object.

The system creates a copy of the data object for a tracking event in the application program, creates a flow tracking object for the tracking event, and records information associated with the tracking event into the flow tracking object as the tracking event processes the copy of the data object. For example, the system creates a copy of the tainted data object for the invocation of a method that uses the tainted data object, creates a flow tracking object, embeds the flow tracking object in the copy of the tainted data object, and records information about the method, and the location in the application program where the method was invoked, into the embedded flow tracking object.

The system outputs the copy of the data object to a data sink, creates a sink tracking object for the data sink, and records information associated with the data sink into the sink tracking object. For example, the system prints the copy of the data object, creates a sink tracking object for the printing of the copy of the data object, and records information about the printing of the copy of the data object, and the location in the application program where the printing occurred, into the sink tracking object.

The system outputs the source tracking object, the flow tracking object, and the sink tracking object as dynamic analysis of dataflow in the application program. For example, the system outputs the sink tracking object as a first node in a graph, the flow tracking object as a second node in the graph, and the sink tracking object as a third node in the graph, with the second node linked to the first node and the third node linked to the second node to depict the dataflow sequence of the graph. The graph and its associated information depict not only the data source and the data sink, but also depict the dataflow through the application program, which enables the identification of any tracking event as an additional vulnerability. Accordingly, systems and methods are provided which enable a database system to improve the performance, efficiency, and the ease of use of dynamic analysis of dataflow in application programs. Although examples describe a database system executing the actions, the actions may be executed by a system that does not need to reference a database. Therefore, the use of the term "database system" in the following description and examples is not intended to be limiting.

While one or more implementations and techniques are described with reference to an embodiment in which dynamic analysis tracking objects for application dataflow is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for dynamic analysis tracking objects for application dataflow.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for dynamic analysis tracking objects for application dataflow will be described with reference to example embodiments.

The following detailed description will first describe a method for dynamic analysis tracking objects for application dataflow.

Next, a block diagram of a portion of example application code and its associated dataflow graph for dynamic analysis tracking objects for application dataflow is described.

Figure 1:
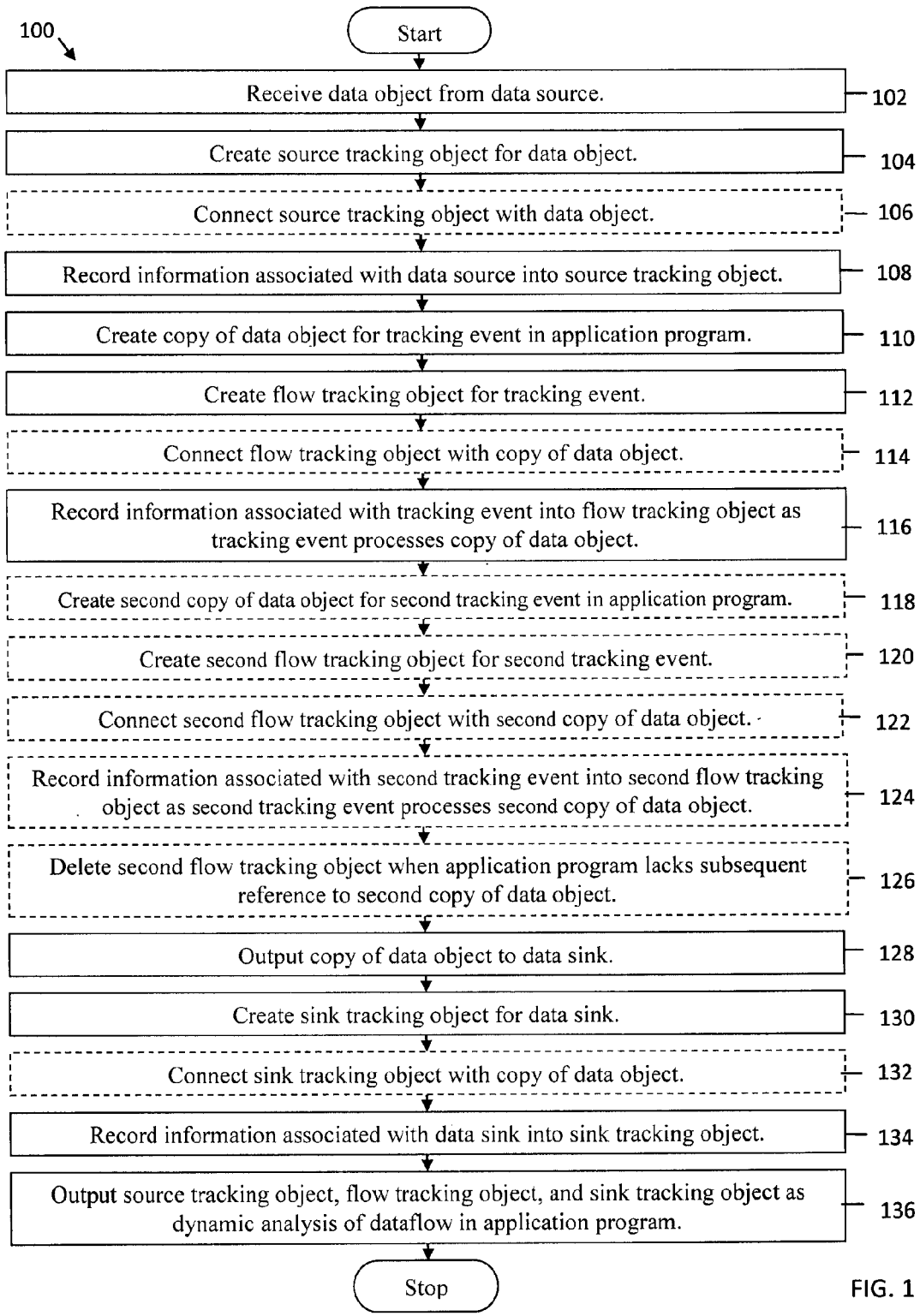
FIG. 1 is an operational flow diagram illustrating a high level overview of a method for dynamic analysis tracking objects for application dataflow in an embodiment.

FIG. 1 is an operational flow diagram illustrating a high level overview of a method 100 for dynamic analysis tracking objects for application dataflow. As shown in FIG. 1, a database system can provide dynamic analysis of dataflow in application programs.

In block 102, a data object for an application program is received from a data source. For example and without limitation, this can include the database system getting a parameter from an untrusted data source and storing the parameter as a tainted data object. Although this example describes the application dataflow beginning with a tainted data source, the application dataflow may begin with any point of interest in the code, whether tainted or untainted. A data source can be arbitrary defined as a point in the code based on whatever logic is required.

In block 104, a source tracking object is created for a data object. By way of example and without limitation, this can include the database system creating a source tracking object for the tainted data object. A tracking object may be referred to as a node object, as the tracking object may be subsequently represented by a node in a dataflow graph. Below is an example pseudo code data structure for a tracking object, which may be for a source tracking object, a flow tracking object, or a sink tracking object.

```
Public class Node {
    private Node parents[ ];
    private int datapoint;
    private int taint_info;
}
```

The parents array attribute points to the parent nodes for the current node. The datapoint attribute stores location identifiers about where information associated with tainted data is collected. Example location identifiers include filenames, line numbers, etc. However, instead of storing a string to represent a location identifier, the database system may create a hashmap with an integer as the key and a string as the value, and subsequently lookup the hashmap for the actual location of the location identifier, thereby conserving database system resources. The taint_info attribute stores taint information related to the location associated with the tainted data, such as whether it is a data source, a data sink, a sanitization point, etc. A sanitization point is a location in an application program designed to replace potentially dangerous data with non-dangerous data, such as replacing hyper-text markup language (HTML) control characters.

In block 106, a source tracking object is optionally connected with a data object. In embodiments, this can include the database system embedding the source tracking object in the tainted data object, thereby enabling the tracking of taint and the associated dataflow as the data object flows through the application program. Such a connection allows the database system to easily tie the tracking objects and their data flows together without having to create a separate out-of-band mechanism to do this. Additionally, as described below in reference to block 126, embedding a tracking object in a tainted data object leverages the garbage collector, such that when a tracking object is subsequently deleted, the tracking object's associated data flow information is removed as well, leaving the dataflow information for the tracking objects that are not deleted to represent the application dataflow.

In block 108, information associated with a data source is recorded into a source tracking object. For example and without limitation, this can include the database system recording information about whether the tainted data source was reflective or stored, and recording line number 1 in the application program where the tainted data was collected, in the embedded source tracking object. The database system may keep track of the context of the vulnerability, such as the nature of the potential vulnerability (based on the location/type of taint), whether a tainted data object has been validated or sanitized, and what kind of validation, if any, has been done on the tainted data object. Validation of a data object is a verification that the data object does not include tainted data. The database system may also keep track of the confidence level of the vulnerability, such as how confident the database system is to classify a dataflow into a specific level of vulnerability. For example, an application program may have data sources from reading various external files, with some of the files more trusted than the other files. Including a confidence level can help in defining how likely an identified dataflow is a real vulnerability. The database system may also include the capability of tracking method invocation on both the caller and the callee sides, which may help a system user to better understand the connection between the data object used when calling the method and the data object used within the called method. The database system may record the callee information at the reporting time, and not as the process normally flows. When reporting information after a data sink is reached, the database system can report two data points per function call, at the caller side and at the callee side.

In block 110, a copy of a data object is created for a tracking event in an application program. By way of example and without limitation, this can include the database system creating a copy of the tainted data object for the invocation of a method that uses the tainted data object. Creating a copy of the tainted data object, which may be referred to as "splitting the object," enables dynamic analysis to track different copies of the same tainted data object that take different paths in the application program, such as from the same data source to the same data sink. Creating a copy of the tainted data object is also necessary to prune the dataflow graph to remove irrelevant dataflow information, as discussed below in reference to block 126. Creating a copy of the tainted data object may eliminate false positives and false negatives, because every data flow path is treated independently with its privately copied data objects, such that any changes to the degree of taintedness of the tainted data object in one dataflow path will not be reflected by the degree of taintedness of the tainted data object in another dataflow path.

In block 112, a flow tracking object is created for a tracking event. In embodiments, this can include the database system creating a flow tracking object for a tracking event, such as a method invocation or an assignment. When the application program invokes a method, the database system may record an identifier of the method, the method arguments, and any instance object, into the flow tracking object, thereby enabling the database system to track tainted data objects for method invocations that use the tainted data objects as arguments. When the application program assigns an object or a value to an object, the database system records information about this assignment in the flow tracking object, thereby enabling the database system to track tainted data objects as they are passed by assignments. Similarly, the database system can record information for any other type of tracking event, such as field accesses, stores, array access, etc. As the tracking objects record information for tracking events, the database system associates the tracking objects together to enable the creation of a complete graph that depicts how tainted data flows in the application program. The database system associates the tracking objects together by having each new tracking object, which represents a new location in the data flow, point to the previous tracking object in the dataflow, such as by having the flow tracking object point to the source tracking object In some cases, a single tracking object can have multiple parents, since multiple objects can propagate into a single object. For example, when multiple strings objects are concatenated, the output is a single data object that has multiple parents, and each of these parents tracks the dataflow to the source in which the data object was introduced.

In block 114, a flow tracking object is optionally connected with a copy of a data object. For example and without limitation, this can include the database system embedding the flow tracking object in the copy of the tainted data object, thereby enabling the tracking of the tainted data object and the associated dataflow as the tainted data object flows through the application program. Such a connection allows the database system to easily tie the tracking objects and their data flows together without having to create a separate out-of-band mechanism to do this.

In block 116, information associated with a tracking event is recorded into a flow tracking object as a tracking event processes a copy of a data object. By way of example and without limitation, this can include the database system recording information about the method invoked, and the line number 3 in the application program where the method was invoked, into the embedded flow tracking object.

In block 118, a second copy of a data object is optionally created for a second tracking event in an application program. In embodiments, this can include the database system creating a second copy of the tainted data object for the invocation of a second method that uses the tainted data object. Creating another copy of the tainted data object enables the dynamic analysis to track different copies of the same tainted data object that take different paths in the application program, such as from the same data source to the same data sink. Although FIG.1 describes an example of an application program that includes four tracking events (source, first method, second method, and sink), an application program may include fewer or a greater number of tracking events.

In block 120, a second flow tracking object is optionally created for a second tracking event. For example and without limitation, this can include the database system creating a second flow tracking object for a second tracking event, such as an assignment or another method invocation. The database system associates the tracking objects together by having each new tracking object, which represents a new location in the data flow, point to the previous tracking object in the dataflow, such as by having the second flow tracking object point to the source tracking object. In this situation, the second flow tracking object may subsequently point to the source tracking object instead of pointing to the first flow tracking object when the garbage collector deletes the first flow tracking object.

In block 122, a second flow tracking object is optionally connected with a second copy of a data object. By way of example and without limitation, this can include the database system embedding the second flow tracking object in the second copy of the tainted data object. Such a connection allows the database system to easily tie tracking objects and their data flows together without having to create a separate out-of-band mechanism to do this.

In block 124, information associated with a second tracking event is optionally recorded into a second flow tracking object as a second tracking event processes a second copy of a data object. In embodiments, this can include the database system recording information about the second invoked method, and the line number in the application program where the second method was invoked, into the embedded flow tracking object.

In block 126, a second flow tracking object is optionally deleted when an application program lacks a subsequent reference to second copy of a data object. For example and without limitation, this can include the database system deleting the second flow tracking object when the application program lacks any subsequent references to the second copy of the tainted data object. In this instance, the garbage collector deletes the second copy of the tainted data object because subsequent lines in the application program do not reference the second copy of the tainted data object, which means that the second copy of the tainted data object does not have any impact on the final vulnerability and the application program's dataflow. This enables the database system to prune the dataflow graph to remove the dataflow associated with the second copy of the tainted data object as irrelevant. The garbage collector deleting data objects and their associated tracking objects is discussed further below in reference to FIG. 2.

In block 128, a copy of a data object is output to a data sink for an application program. By way of example and without limitation, this can include the database system printing the copy of the data object. Although this example describes the application dataflow ending with a data sink, the application dataflow may end with any point of interest in the code. A data sink can be arbitrary defined as a point in the code based on whatever logic is required.

In block 130, a sink tracking object is created for a data sink. In embodiments, this can include the database system creating a sink tracking object for the printing of the copy of the data object.

In block 132, a sink tracking object is optionally connected with a copy of a data object. For example and without limitation, this can include the database system embedding the sink tracking object into the copy of the tainted data object. Such a connection allows the database system to easily tie the tracking objects and their data flows together without having to create a separate out-of-band mechanism to do this.

In block 134, information associated with a data sink is recorded into a sink tracking object. By way of example and without limitation, this can include the database system recording information about the data sink, and the line number 6 in the application program where the printing occurred, into the sink tracking object.

In block 136, a source tracking object, a flow tracking object, and a sink tracking object are output as dynamic analysis of dataflow in an application program. In embodiments, this can include the database system outputting the sink tracking object as a first node in a graph, the flow tracking object as a second node in the graph, and the source tracking object as a third node in the graph, with the second node linked to the first node and the third node linked to the second node to depict the dataflow sequence of the graph. Each node in the graph represents a location in the flow of a tainted data object through the application program. As the tainted data objects flowed through the application program, the database system collected information and recorded the information in the tracking objects associated with these nodes. The collection of this information and nodes represents the data flow of a single data object through the nodes being linked together to construct a graphic representation of the dataflow in the application program. The graph and its associated information depict not only the data source and the data sink, but also depict the dataflow through the application program, which enables the identification of any method invocations, assignments, and any other tracking events as additional vulnerabilities.

Accordingly, systems and methods are provided which enable a database system to improve the performance, efficiency, and the ease of use of dynamic analysis of dataflow in application programs. The method 100 may be repeated as desired. Although this disclosure describes the blocks 102-136 executing in a particular order, the blocks 102-136 may be executed in a different order. Further, although the examples illustrated in this disclosure describe the application dataflow beginning with a tainted data source for purposes of explanation, the application dataflow may begin with any point of interest in the code, whether tainted or untainted. Likewise, although the examples contained herein describe a database system executing the actions, the actions may be executed by a system that does not need to reference a database.

Figure 2:
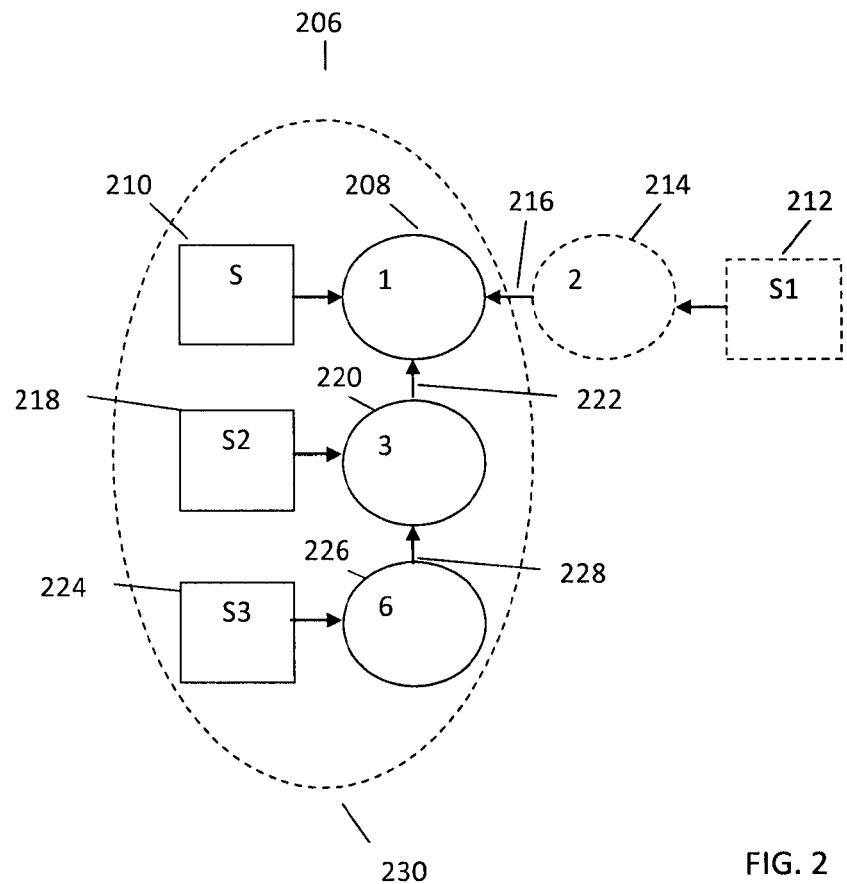
FIG. 2 is a block diagram of a portion of example application code and its associated dataflow graph for a dynamic analysis tracking objects for application dataflow.

FIG. 2 is a block diagram of a portion of example application code and its associated dataflow graph for dynamic analysis tracking objects for application dataflow in an embodiment. The block includes a portion of example application code 200, which includes an application code column 202 and a code line number column 204. The block diagram of a portion of example application code and its associated dataflow graph includes also includes a dataflow graph 206.

In the portion of example application code 202, an application program gets a tainted string "s" from the request in line 1, and calls a function "foo" in line 2. The function "foo" prints a static string in line 4. After the application program returns from the function "foo", the application program calls the function "bar" in line 3, which prints out the tainted string "s" in line 6. The database system creates new tracking objects during the tracking events, such as getting the parameter "s," calling the function "foo," calling the function "bar," and printing the string "s," with previously created tracking objects becoming the parents of the subsequently created tracking objects. The taint information is stored in a hierarchical way, in which the dataflow is represented by chaining a series of tracking objects that were created along the tracking events through which that the tainted data object flows.

The dataflow graph 206 may evolve based on the following steps. When the application program gets the tainted string "s" from the request in line 1, the database system creates a tracking object 1 208 and embeds the tracking object 1 208 into the tainted string s 210. After the application program calls the function "foo" in line 2, the database system creates a copy of the tainted string s1 212, creates a tracking object 2 214, points the tracking object 2 214 to the tracking object 1 208 via the pointer 216, and embeds the tracking object 2 214 into the copy of tainted string s 1 212. When the application program calls the function "bar" in line 3, the database system creates a copy of the tainted string s2 218, creates a tracking object 3 220, points the tracking object 3 220 to the tracking object 1 208 via the pointer 222, and embeds the tracking object 3 220 into the copy of tainted string s2 218. When the application program prints the string "s" in line 6, the database system references the copy of the tainted string as a copy of the tainted string s3 224, creates a tracking object 6 226, points the tracking object 6 226 to the tracking object 3 220 via a pointer 228, and embeds the tracking object 6 226 into the copy of tainted string s3 224. Based on the preceding the database system may indicate that the detected dataflow is {1, 2, 3, 6}.

However, this is incorrect because the ideal dataflow graph for the portion of example application code 202 is {1, 3, 6}. This ideal dataflow indicates where the tainted data was introduced in line 1, how the data flowed in the application program, such as calling the function "bar" in line 3, and eventually reached the data sink in line 6. The database system should not indicate any irrelevant events, such as calling the function "foo" in line 2, that did not have any impact on the final vulnerability and its dataflow.

In order to correct the dataflow {1, 2, 3, 6}, the database system has to trim off the tracking object 2 214, which keeps the corresponding node from being reported as part of the dataflow graph 206. The reason is that the dataflow {1, 2} is independent from the dataflow {1, 3, 6}, and reporting either dataflow should not include the other dataflow. Any tracking event will create a new branch to the dataflow and the new branch of the dataflow is independent of other dataflows that originated from its main code. Hence, the database system needs to create separate tracking objects to track the new branches of dataflow originated by the tracking events. In order to do this, the database system copies the original data object, such as the string "s" object, every time it reaches a tracking event, such as calling the function "foo" and calling the function "bar."

Whenever a function returns and there is no more reference to the newly copied data object, the garbage collector automatically frees the newly copied data object. As one example to illustrate this approach, whenever a new function is called, the database system copies the string object and uses that copied string object to replace the original string object as the argument to the called function. Then, a new tracking object is created and embedded into the copied string object. At line 3, when the function "foo" called at line 2 returns, the copied string s1 212 will be out of scope and garbage collected because the application program includes no more reference to the copied string s1 212. At that time, the associated tracking object 2 214 is automatically garbage collected as well. When the application program calls the function "bar," the database system continues to track dataflow from the original string s 210 and not from the copied string s1 212. Hence when the application program reaches the sink in line 6, the dataflow 230 based on the lines {1, 3, 6} is reported as the vulnerability path because the string "s" is not sanitized, with the order reversed to be from the data source to the data sink. The database system enables removing the taint information completely from all tracking objects. Whenever a tainted data object reaches a data sink, the database system may climb up the tracking object tree associated with the data sink to determine if the associated dataflow represents a vulnerability.

System Overview

Figure 3:
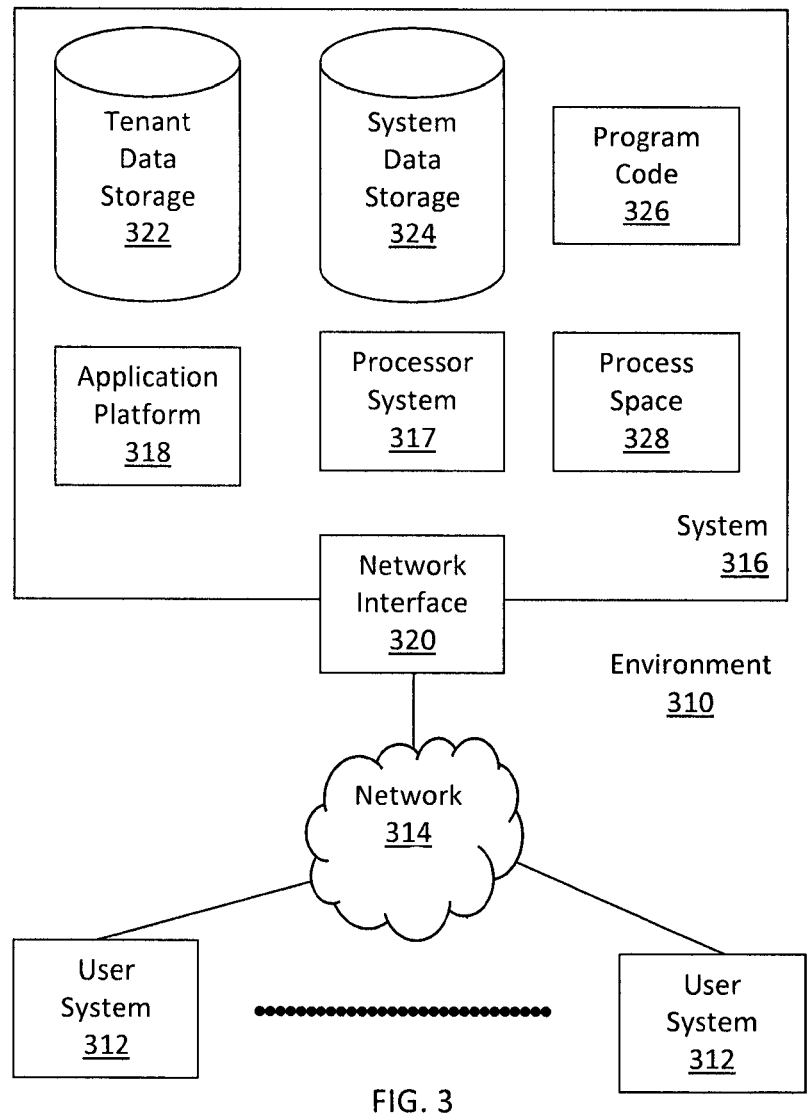
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
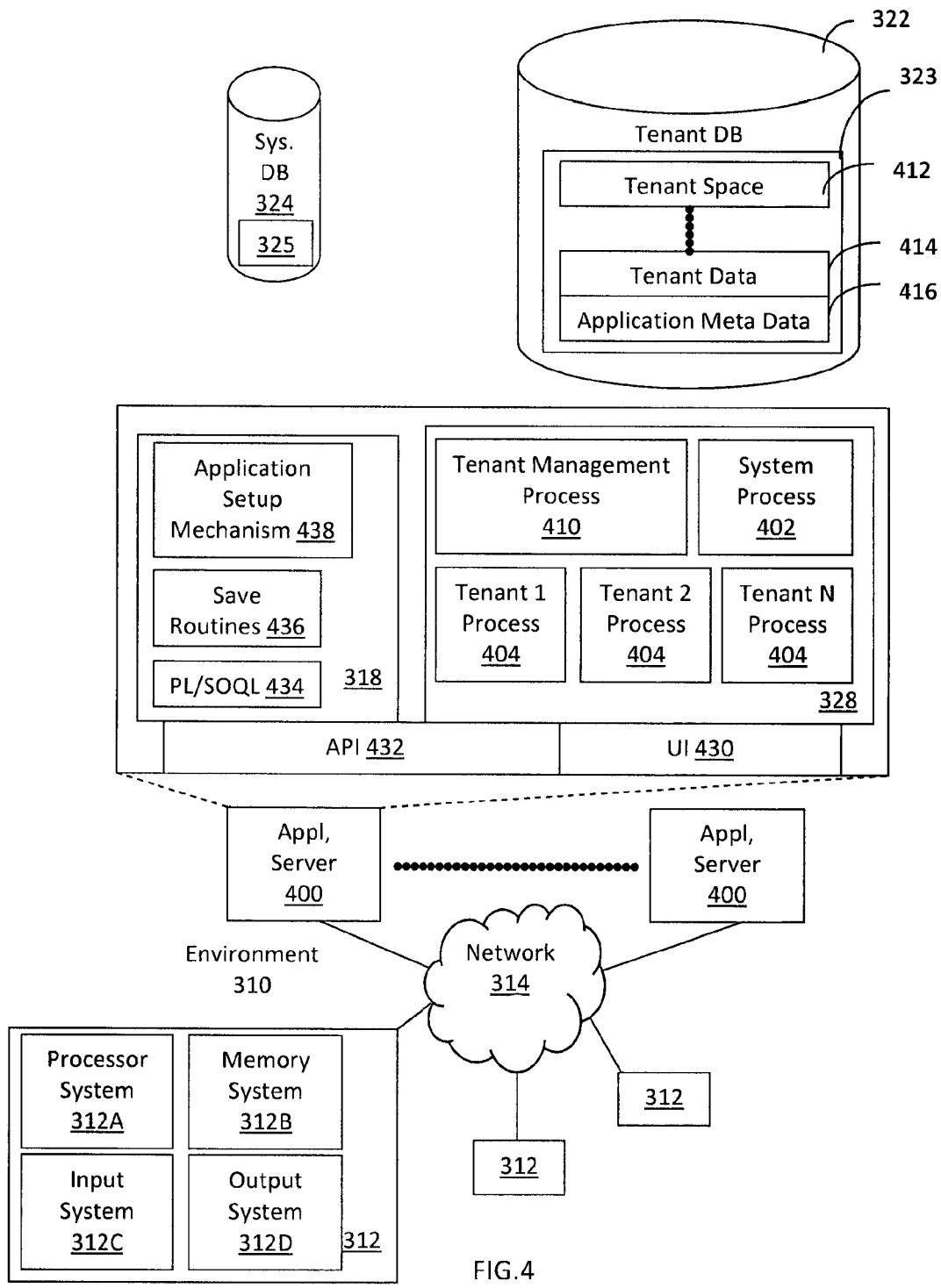
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for dynamic analysis tracking objects for application dataflow, the apparatus comprising:
   a processor; and
   one or more stored sequences of instructions which, when executed by the processor, cause the processor to:
      receive a data object from a data source;
      create a source tracking object for the data object;
      record information associated with the data source into the source tracking object;
      create a copy of the data object for a tracking event in the application program;
      create a flow tracking object for the tracking event;
      record information associated with the tracking event into the flow tracking object as the tracking event processes the copy of the data object;
      output the copy of the data object to a data sink;
      create a sink tracking object for the data sink;
      record information associated with the data sink into the sink tracking object; and
      output the source tracking object, the flow tracking object, and the sink tracking object as dynamic analysis of dataflow in the application program.

2. The apparatus of claim 1, wherein the instructions, when executed by the processor, cause the processor to:
   connect the source tracking object with the data object;
   connect the flow tracking object with the copy of the data object; and
   connect the sink tracking object with the copy of the data object.

3. The apparatus of claim 1, wherein the tracking event comprises one of a method invocation, an assignment, field access, store, and array access.

4. The apparatus of claim 1, wherein outputting the source tracking object, the flow tracking object, and the sink tracking object comprises outputting the sink tracking object as a first node in a graph, the flow tracking object as a second node in the graph, and the sink tracking object as a third node in the graph, wherein the second node is linked to the first node and the third node is linked to the second node to depict the dataflow sequence of the graph.

5. The apparatus of claim 1, wherein the steps further comprise:
   create a second copy of the data object for a second tracking event in the application program;
   create a second flow tracking object for the second tracking event;
   connect the second flow tracking object with the second copy of the data object;
   record information associated with the second tracking event into the second flow tracking object as the second tracking event processes the second copy of the data object; and
   delete the second flow tracking object when the application program lacks a subsequent reference to the second copy of the data object.

6. A non-transitory machine-readable medium carrying one or more sequences of instructions for dynamic analysis tracking objects for application dataflow, which instructions, when executed by one or more processors, cause the one or more processors to carry out the steps of: receiving a data object from a data source; creating a source tracking object for the data object; recording information associated with the data source into the source tracking object; creating a copy of the data object for a tracking event in the application program; creating a flow tracking object for the tracking event; recording information associated with the tracking event into the flow tracking object as the tracking event processes the copy of the data object; outputting the copy of the data object to a data sink; creating a sink tracking object for the data sink; recording information associated with the data sink into the sink tracking object; and outputting the source tracking object, the flow tracking object, and the sink tracking object as dynamic analysis of dataflow in the application program.

7. The non-transitory machine-readable medium of claim 6, wherein the steps further comprise: connecting the source tracking object with the data object; connecting the flow tracking object with the copy of the data object; and connecting the sink tracking object with the copy of the data object.

8. The non-transitory machine-readable medium of claim 6, wherein the tracking event comprises one of a method invocation, an assignment, field access, store, and array access.

9. The non-transitory machine-readable medium of claim 6, wherein outputting the source tracking object, the flow tracking object, and the sink tracking object comprises outputting the sink tracking object as a first node in a graph, the flow tracking object as a second node in the graph, and the sink tracking object as a third node in the graph, wherein the second node is linked to the first node and the third node is linked to the second node to depict the dataflow sequence of the graph.

10. The non-transitory machine-readable medium of claim 6, wherein the steps further comprise: creating a second copy of the data object for a second tracking event in the application program; creating a second flow tracking object for the second tracking event; connecting the second flow tracking object with the second copy of the data object; recording information associated with the second tracking event into the second flow tracking object as the second tracking event processes the second copy of the data object; and deleting the second flow tracking object when the application program lacks a subsequent reference to the second copy of the data object.

11. A method for dynamic analysis tracking objects for application dataflow, the method comprising:
    receiving, by a computing system having at least one processor, a data object from a data source;
    creating, by the computing system, a source tracking object for the data object;
    recording, by the computing system, information associated with the data source into the source tracking object;
    creating, by the computing system, a copy of the data object for a tracking event in the application program;
    creating, by the computing system, a flow tracking object for the tracking event;
    recording, by the computing system, information associated with the tracking event into the flow tracking object as the tracking event processes the copy of the data object;
    outputting, by the computing system, the copy of the data object to a data sink;
    creating, by the computing system, a sink tracking object for the data sink;
    recording, by the computing system, information associated with the data sink into the sink tracking object; and
    outputting, by the computing system, the source tracking object, the flow tracking object, and the sink tracking object as dynamic analysis of dataflow in the application program.

12. The method of claim 11, wherein the method further comprises:
    connecting, by the computing system, the source tracking object with the data object;
    connecting, by the computing system, the flow tracking object with the copy of the data object; and
    connecting, by the computing system, the sink tracking object with the copy of the data object.

13. The method of claim 11, wherein the tracking event comprises one of a method invocation, an assignment, field access, store, and array access.

14. The method of claim 11, wherein outputting the source tracking object, the flow tracking object, and the sink tracking object comprises outputting, by the computing system, the sink tracking object as a first node in a graph, the flow tracking object as a second node in the graph, and the sink tracking object as a third node in the graph, wherein the second node is linked to the first node and the third node is linked to the second node to depict the dataflow sequence of the graph.

15. The method of claim 11, wherein the method further comprises:
    creating, by the computing system, a second copy of the data object for a second tracking event in the application program;
    creating, by the computing system, a second flow tracking object for the second tracking event;
    connecting, by the computing system, the second flow tracking object with the second copy of the data object;
    recording, by the computing system, information associated with the second tracking event into the second flow tracking object as the second tracking event processes the second copy of the data object; and
    deleting, by the computing system, the second flow tracking object when the application program lacks a subsequent reference to the second copy of the data object.

16. A method for transmitting code for dynamic analysis tracking objects for application dataflow, the method comprising:
    transmitting code, by at least one computer processor, to receive a data object from a data source;
    transmitting code, by the at least one computer processor, to create a source tracking object for the data object;
    transmitting code, by the at least one computer processor, to record information associated with the data source into the source tracking object;

transmitting code, by the at least one computer processor, to create a copy of the data object for a tracking event in the application program;

transmitting code, by the at least one computer processor, to create a flow tracking object for the tracking event;

transmitting code, by the at least one computer processor, to record information associated with the tracking event into the flow tracking object as the tracking event processes the copy of the data object;

transmitting code, by the at least one computer processor., to output the copy of the data object to a data sink;

transmitting code, by the at least one computer processor, to create a sink tracking object for the data sink;

transmitting code, by the at least one computer processor, to record information associated with the data sink into the sink tracking object; and transmitting code, by the at least one computer processor, to output the source tracking object, the flow tracking object, and the sink tracking object as dynamic analysis of dataflow in the application program.

17. The method for transmitting code of claim 16, wherein the method further comprises:

transmitting code, by the at least one computer processor, to connect the source tracking object with the data object;

transmitting code, by the at least one computer processor, to connect the flow tracking object with the copy of the data object; and transmitting code, by the at least one computer processor, to connect the sink tracking object with the copy of the data object.

18. The method for transmitting code of claim 16, wherein the tracking event comprises one of a method invocation, an assignment, field access, store, and array access.

19. The method for transmitting code of claim 16, wherein outputting the source tracking object, the flow tracking object, and the sink tracking object comprises outputting, by the at least one computer processor, the sink tracking object as a first node in a graph, the flow tracking object as a second node in the graph, and the sink tracking object as a third node in the graph, wherein the second node is linked to the first node and the third node is linked to the second node to depict the dataflow sequence of the graph.

20. The method for transmitting code of claim 16, wherein the method further comprises:

transmitting code, by the at least one computer processor, to create a second copy of the data object for a second tracking event in the application program;

transmitting code, by the at least one computer processor, to create a second flow tracking object for the second tracking event;

transmitting code, by the at least one computer processor, to connect the second flow tracking object with the second copy of the data object;

transmitting code, by the at least one computer processor, to record information associated with the second tracking event into the second flow tracking object as the second tracking event processes the second copy of the data object; and transmitting code, by the at least one computer processor, to delete the second flow tracking object when the application program lacks a subsequent reference to the second copy of the data object.

* * * * *